United States Patent [19]

Chireau et al.

[11] 4,124,743

[45] Nov. 7, 1978

[54] MERCURY-FREE SECONDARY ALKALINE BATTERY AND IMPROVED NEGATIVE INTERSEPARATOR THEREFOR

[75] Inventors: Roland F. Chireau, Quaker Hill, Conn.; Aldo S. Berchielli, Westerly, R.I.

[73] Assignee: Yardngy Electric Corporation, Pawcatuck, Conn.

[21] Appl. No.: 841,864

[22] Filed: Oct. 13, 1977

[51] Int. Cl.$^2$ .......................................... H01M 10/26
[52] U.S. Cl. .................................... 429/144; 429/198; 429/248
[58] Field of Search ............... 429/248, 207, 216, 198, 429/229, 144

[56] References Cited

U.S. PATENT DOCUMENTS

| | | | |
|---|---|---|---|
| 2,816,154 | 12/1957 | Mendelsohn | 429/248 |
| 3,553,027 | 1/1971 | Oswin et al. | 429/207 |
| 3,580,740 | 5/1971 | James | 429/229 |
| 3,642,539 | 2/1972 | Kawakami | 429/207 |
| 4,022,953 | 5/1977 | Charkey | 429/229 |

FOREIGN PATENT DOCUMENTS

| | | | |
|---|---|---|---|
| 935,510 | 10/1973 | Canada | 429/248 |
| 1,038,152 | 8/1966 | United Kingdom | 429/248 |

*Primary Examiner*—Donald L. Walton
*Attorney, Agent, or Firm*—Donald E. Nist

[57] ABSTRACT

Hydrogen gas evolution in secondary alkaline batteries which utilize zinc electrodes is reduced by incorporating mercury-free additives in the negative interseparators of such batteries. The additives disclosed herein are certain electrolyte-soluble compounds of lead, cadmium and tin.

11 Claims, No Drawings

MERCURY-FREE SECONDARY ALKALINE BATTERY AND IMPROVED NEGATIVE INTERSEPARATOR THEREFOR

BACKGROUND OF THE INVENTION

This invention relates to alkaline secondary electrochemical batteries which utilize zinc as the active electrode material and, more particularly, it relates to the use of mercury-free zinc electrodes in such cells and to improved negative interseparators for use in such cells.

Zinc is used as the negative electrode material in alkaline electrochemical cells and batteries for a number of reasons including its high half-cell voltage, its low polarization, and its high limiting current density on discharge. However, a number of adverse effects result from such use of zinc. Thus, because it is thermodynamically unstable in alkaline media, zinc self-discharges significantly while standing. Such discharge is accompanied by the evolution of hydrogen. Together, these reactions produce electrode corrosion and shortened shelf life.

In order to overcome the aforementioned disadvantages while still taking advantage of the benefits derived from the use of zinc, battery manufacturers normally include small amounts of mercury in zinc electrodes to reduce self-discharging of the latter and to reduce evolution of hydrogen. Such reductions are made possible by the fact that mercury has a substantially higher hydrogen overvoltage than does zinc.

Although the use of mercury in zinc electrodes is advantageous, its presence in such cells and batteries and the processes associated with the introduction of mercury into such cells and batteries present both environmental and health hazards. Therefore, it would be desirable to be able to produce mercury-free zinc electrodes having electrochemical characteristics similar to or better than mercury-containing zinc electrodes.

Inorganic additives other than mercury have been included in zinc electrodes for some time in order to reduce the corrosion of such electrodes by reducing their self-discharge in alkaline solution. Suggested additives have included: lead, lead oxide, lead hydroxide, lead sulfide, indium hydroxide, stannous chloride and thallium oxide. The aforementioned additives may be used in the absence of or in combination with mercury in zinc electrodes. Exemplary of the use of such additives in zinc electrodes are U.S. Pat. Nos. 3,639,176, 3,642,539, 3,847,669, 3,816,178 and 3,785,868. Although these additives have been found to be partially effective in reducing self-discharge of zinc electrodes in alkaline media, the same additives may adversely affect the potential-current curve on discharge, particularly at high battery drain rates.

SUMMARY OF THE INVENTION

This invention is embodied in a secondary alkaline battery utilizing zinc as the active negative electrode material and including a negative interseparator positioned between the negative electrode and a main separator. The invention comprises the use of electrolyte-soluble salts in the negative interseparator to avoid the necessity for using mercury in the negative electrode for the suppression of hydrogen gas evolution. The aforementioned salts are materials which, in addition to being at least slightly soluble in the alkaline medium, provide cations which can be reduced to an adherent species in the battery environment to form a protective coating on the zinc electrode. The aforementioned salts are compounds of lead, cadmium and tin having the above-noted characteristics.

The coating produced on the negative electrode by the herein-employed salts serves to reduce hydrogen gas evolution upon standing, i.e. upon self-discharge of the battery. Additionally, such reduction of hydrogen gas evolution is realized even after numerous charge/discharge cycles which are accompanied by some "loss" of cations due to the irreversible nature of the reactions involved because the interseparator provides a reservoir of cations to replace those lost in the referenced reactions.

DESCRIPTION OF THE PREFERRED EMBODIMENT

The described invention relates to secondary alkaline electrochemical cells and batteries which utilize zinc as the active (negative) electrode material, a material which is more electropositive than zinc as the active positive electrode material, and an alkaline electrolyte. When fabricated, the negative electrode may include zinc in its metallic (charged) form, i.e. Zn, or in its oxidized (discharged) form, i.e. ZnO. The positive electrode in such cells may include as the active electrode material nickel, manganese, or silver. The alkaline electrolyte is an aqueous solution of an hydroxide such as lithium hydroxide, potassium hydroxide, sodium hydroxide and cesium hydroxide, and mixtures thereof.

Commonly, such secondary alkaline cells include separators disposed between the electrodes. For example, a separator system may include a main separator and negative and positive interseparators disposed between the main separator and the negative and positive electrodes, respectively. Such separator systems are well known and do not form an essential feature of this invention except to the extent that the negative interseparator is utilized as a carrier or reservoir for the herein-described additives and is novel in composition. Therefore, for exemplary purposes only, a positive interseparator may be formed from nylon (Pellon) and a main separator may be formed from cellophane or silverized cellophane. Fabrication of a negative interseparator in accordance with the invention will be described hereinafter with reference to incorporation therein of the described additives.

Typically, the secondary alkaline battery includes a casing with one or more negative electrodes and one or more positive electrodes disposed therein in intimate contact with the alkaline electrolyte. The separator system may be utilized in the form of a "U"-wrap, as is well known, with the main separator disposed between confronting surfaces of adjacent positive and negative electrodes so that it forms a "U" around a positive electrode, with negative and positive interseparators positioned on oposite sides of the main separator in parallel relationship therewith.

Turning now to the essential elements of this invention, the novel negative interseparators of the aforementioned secondary alkaline cells or batteries of the invention are provided with an effective amount of an additive having certain characteristics. First, the additive must be at least slightly soluble in the alkaline electrolyte employed in a given application. Such solubility is required to facilitate electrodialytic transport of cations (derived from the additive) to the negative electrode. Secondly, the additive must be capable of generating cations which are electro-reducible to an insoluble adherent species (preferably the metal form) on the zinc-containing electrode at potentials normally encountered in the electrode environment of the described secondary alkaline cells, i.e. at potentials positive (noble) to the zinc electrode. Thirdly, the reduced species (e.g. the metal form) must has either a high hydrogen overvoltage (on the order of one volt or more) or a reversible potential which is positive with respect to hydrogen.

The additive comprises a salt selected from the group consisting of a cadmium-containing salt, a lead-containing salt, a tin-containing salt, and mixtures thereof having the previously described necessary characteristics. Of these salts the preferred species are selected from the group consisting of lead titanate, lead acetate, lead zirconate, cadmium acetate, cadmium zirconate, cadmium titanate, and tin zirconate. Mixtures of these additives may also be used.

The additive can be incorporated into the negative interseparator when the latter is fabricated or the negative interseparator sheet can be impregnated with a solution containing the additive. Alternatively, the additive can be sprayed from a solution on to the negative interseparator. The negative interseparator can be fabricated of any suitable material such as nylon and polypropylene non-woven felt, long fiber asbestos (aluminosilicate) mats, glass fiber and zirconia fiber mats and the like.

In general, the amount of additive carried on or incorporated in the negative interseparator will depend upon the characteristics and function of each battery in which the additive is incorporated. As the amount of additive approaches zero, there will be less than an effective amount of additive to accomplish the hereinbefore-described purposes, particularly after many charge-discharge cycles. On the other hand, as the amount of additive utilized increases, a level will be reached where there is more than enough additive to accomplish those purposes and to serve as a reservoir. Since an excess amount effectively serves no function while occupying some space within a battery, it is preferable not to use an excess amount so that the volume available for the active electrode materials, etc., is not significantly diminished. Typically, the amount of additive (as the metal) utilized can range from about 0.5 to about 5% per unit weight of the inorganic fibrous laminate.

In operation, the zinc electrode is plated with a layer of the protective material (the reduced form of the cations derived from the additive) when the battery containing the additive is charged or when on open circuit (i.e. on stand). After the initial discharge, zinc will also be deposited on the zinc electrode along with the protective material during the charging phase of each charge/discharge cycle. When the circuit is closed, i.e., upon discharge, the battery potential drops to the oxidation potential of the protective material which is consumed (oxidized) and returns to the electrolyte as ions. When the protective material has been removed as a coating from the zinc electrode, the zinc can then freely oxidize at its usual voltage so that power can be withdrawn from the battery. When the circuit is again opened or the battery charged, the zinc electrode will again become coated with the protective material. The foregoing sequence of coating or plating followed by dissolution of the coating will be repeated with every charge/discharge cycle.

When the protective material is dissolved back into the electrolyte, it does so at least to some extent in a form (plumbate ions in the case of lead) which cannot be reduced to again coat the zinc electrode during the next charge. Therefore, some of the protective material is "lost" for electrode coating purposes; however, because the negative interseparator includes am ample supply of additive, the cations lost as described will be replaced by a new supply of cations from the additive remaining in the negative interseparator. Therefore, in spite of some loss with each charge/discharge cycle, a relatively constant supply of cations will be available in the electrolyte for reduction and for coating of the zinc surface. This is an advantage which is not obtained if the additive is merely included in the electrode or electrolyte. In those latter instance, after a limited number of charge/discharge cycles the active metal species from the additive in close contact with the zinc active material of the electrode is used up, due to the dissolution/dissociation process.

This invention will be further described by the following specific Examples:

EXAMPLE I

An inorganic fibrous laminate (IFL) containing lead titanate was made by dispersing 672 gm. of an admixture consisting of 85% by weight potassium titanate, 9% by weight asbestos fibers, 2% by weight carboxymethylcellulose gum, and 4% by weight lead titanate into 8,000 ml of deionized water. The resultant slurry was then cast into a sheet, which was dried and rolled down to final thickness (5 to 6 mils). This sheet was used as a negative interseparator against the zinc electrode in silver/zinc cells.

Ten ampere hour silver/zinc test cells were fabricated utilizing the lead titanate-bearing IFL negative interseparator material. The cells consisted of 4 positive silver electrodes and five negative zinc oxide electrodes. The negative electrodes contained 99.5% by weight ZnO and 0.5% by weight CMC. The separator system consisted of a layer of porous polypropylene material as the positive interseparator, four (4) layers of silver-impregnated cellophane against the positive electrode as the main separator, followed by one layer of the IFL/lead titanate material against the negative electrode. The cell pack was placed in a 10 ampere-hour cell case. The cover was sealed to the case and the resultant cell activated with 65 cc of 40 weight % aqueous potassium hydroxide.

Following two formation cycles, the then fully charged cells were placed on wet stand and connected to eudiometers to measure hydrogen gas evolution. The gassing rate at room temperature was determined to be 0.028 cc/day/in$^2$ of negative electrode surface.

Control cells made without the lead titanate in the IFL and with negative electrodes containing 1% by weight mercuric oxide exhibited a gassing rate equivalent to 0.05 cc/day/in$^2$ of negative electrode surface. Accordingly, the lead titanate produced lower hydrogen gas evolution than the mercuric oxide. Moreover, tests on the cells indicated that the electrical performance of the cells containing lead titanate additive was better than that of the controls containing mercuric oxide.

EXAMPLE II

An inorganic fibrous laminate (IFL) of the same composition as set forth in Example I, except for the substitution of cadmium titanate for lead titanate in a concentration of 5% by weight, was prepared in accordance with the procedure of Example I. This laminate was utilized as a negative interseparator in cells otherwise identical to those specified in Example I. Control cells were also made in an identical manner except that the negative electrodes in these cells contained 1% by weight of mercuric oxide and there was no cadmium titanate additive in the negative interseparator.

The test cells and the control cells were all charged at 15 m.a. per square inch rate for 16 hours and then discharged at the 2-hour rate to 1.0 volt per cell. Cells containing the 1% mercuric oxide additive to the negative electrode had an average output of 10 ampere hours while the cadmium titanate-containing cells had an output of 9.4 ampere hours. Accordingly, the electrical characteristics and the performance of the cadmium titantate-containing cells was comparable to those containing the mercuric oxide, while avoiding the hazards connected with mercuric oxide.

Comparable results can be obtained through the use of other concentrations, preferably between about 0.5 and about 5%, of the selected additive, by weight of the negative interseparator in the zinc electrode-containing cells. In parallel tests, when lead acetate, lead zirconate, cadmium acetate, cadmium zirconate and tin zirconate are substituted for the cadmium titanate in a concentration between 0.5 and 5%, by weight of the negative interseparator, results comparable to those set forth above for the cadmium titanate-containing test cells and the lead titanate-containing test cells of Example I are obtained. Tests also indicate that substitution of other forms of negative interseparator materials in place of those called for in Examples I and II produce comparable results so long as the additive is present. Thus, when nylon, or polypropylene non-woven felts, or glass fiber mats or zirconia mats are used in place of the asbestos fibers called for in Examples I and II, effective negative interseparators can be fabricated.

Various other modifications, changes, alterations and additions can be made in the improved negative interseparator of the present invention and the improved zinc electrode-containing cells employing the negative interseparator. All such modifications, changes, alterations and additions as are within the scope of the appended claims form part of the present invention.

What is claimed is:

1. An improved secondary alkaline battery, said battery being mercury-free and comprising:
   A. at least one positive electrode;
   B. at least one zinc negative electrode;
   C. a main separator;
   D. a positive interseparator;
   E. a negative interseparator between said zinc electrode and said main separator and containing a reservoir of electrolyte-soluble additive which, during operation of said battery, yields cations forming a protective coating on said zinc electrode and exhibiting either a hydrogen overvoltage of the order of at least about 1 volt or a reversible potential positive with respect to hydrogen; and
   F. an alkaline electrolyte, the concentration of said additive in said negative interseparator being sufficient to protect said zinc electrode during the normal operation life of said electrode.

2. The improved battery of claim 1 wherein said cations are electro-reducible to adherent species plating out on said zinc electrode at potentials positive to said zinc electrode.

3. The improved battery of claim 2 wherein said additive is selected from the group consisting of a lead-containing salt, cadmium-containing salt, tin-containing salt, and mixtures thereof wherein said salt is sufficiently soluble in said battery environment to generate said cations.

4. The improved battery of claim 3 wherein said salts preferably are selected from the group consisting of lead titanate, lead acetate, lead zirconate, cadmium acetate, cadmium zirconate, cadmium titanate, tin zirconate, and mixtures thereof.

5. The improved battery of claim 3 wherein the concentration of said additive in said negative interseparator is about 0.5–5%, by weight of said negative interseparator.

6. The improved battery of claim 3 wherein said positive electrode comprises silver and wherein said alkaline electrolyte comprises aqueous alkali metal hydroxide.

7. An improved negative interseparator for a secondary alkaline battery containing a zinc negative electrode, said negative interseparator being mercury-free and comprising:
   A. a fibrous laminate; and,
   B. an additive which generates cations electro-reducible to insoluble adherent species on a zinc-containing electrode in an alkaline secondary battery at potentials positive to the zinc electrode, and exhibiting a hydrogen over-voltage of the order of at least about 1 volt or a reversible potential positive with respect to hydrogen, for protection of said zinc electrode, the concentration of said additive in said negative interseparator being sufficient to protect said zinc electrode during the normal operation life of said electrode.

8. The improved negative interseparator of claim 7 wherein said additive is present in said negative interseparator in a concentration of about 0.5–5%, by weight of said negative interseparator.

9. The improved negative separator of claim 7 wherein said additive is selected from the group consisting of a lead-containing salt, cadmium-containing salt, tin-containing salt, and mixtures thereof.

10. The improved negative interseparator of claim 9 wherein said additive is preferably selected from the group consisting of lead titanate, lead acetate, lead zirconate, cadmium acetate, cadmium titanate, cadmium zirconate, tin zirconate, and mixtures thereof.

11. The improved negative separator of claim 10 wherein said additive is present in a concentration of about 0.5–5%, by weight of said negative interseparator.